Figure 1:
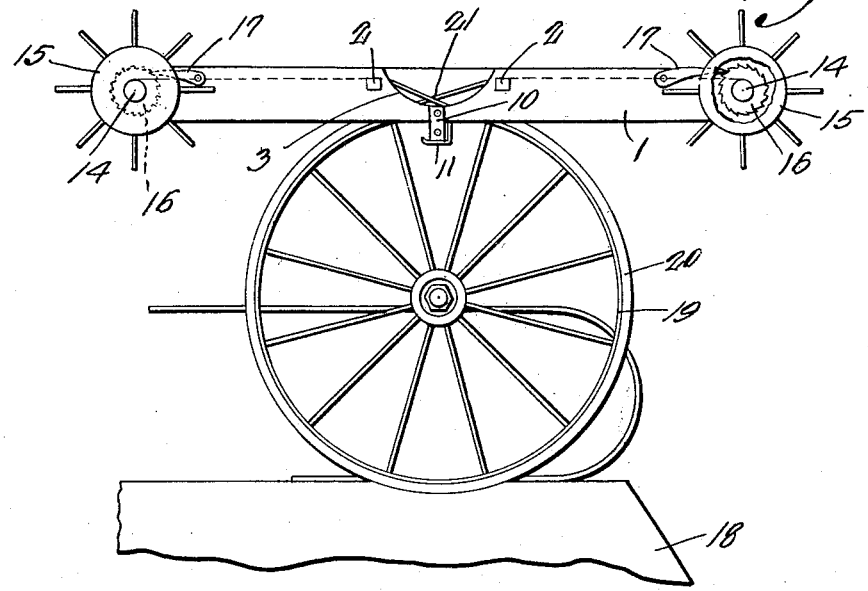

M. K. BENNETT.
TIRE SETTING DEVICE.
APPLICATION FILED SEPT. 23, 1912.

1,114,437.

Patented Oct. 20, 1914.

M. K. Bennett
Inventor

UNITED STATES PATENT OFFICE.

MADISON K. BENNETT, OF GALENA, KANSAS.

TIRE-SETTING DEVICE.

1,114,437. Specification of Letters Patent. Patented Oct. 20, 1914.

Application filed September 23, 1912. Serial No. 721,927.

*To all whom it may concern:*

Be it known that I, MADISON K. BENNETT, a citizen of the United States, residing at Galena, in the county of Cherokee and State of Kansas, have invented a new and useful Tire-Setting Device, of which the following is a specification.

The device herein disclosed is adapted to be employed for applying tires to vehicle wheels, and is adapted peculiarly to be employed for attaching tires to the wheels of baby carriages.

It is well known in the art that vehicles of the type above mentioned differ in construction from other vehicles, in that, to remove the wheel, it is frequently necessary to saw off the connecting bolts and otherwise to injure and damage the structure, so that a considerable amount of mechanical effort is necessary, after the replacing of the tires, in order to restore the structure to operative condition.

The present invention aims, among other things, to provide a tire setting structure which may be applied to the wheel of a vehicle, without removing the wheel from the axle.

It is within the scope of the invention to provide a device of the type above mentioned, having novel means for receiving and for holding the rim of the wheel, to provide novel means for tightening the connecting wires of the tire, to provide a tire setting device in which access may be had readily to the adjacent ends of the connecting wire, the structure, at the same time, being rendered rigid and unyielding; and to enhance the utility of structures of that type to which the present invention appertains.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawing:—

Figure 2:
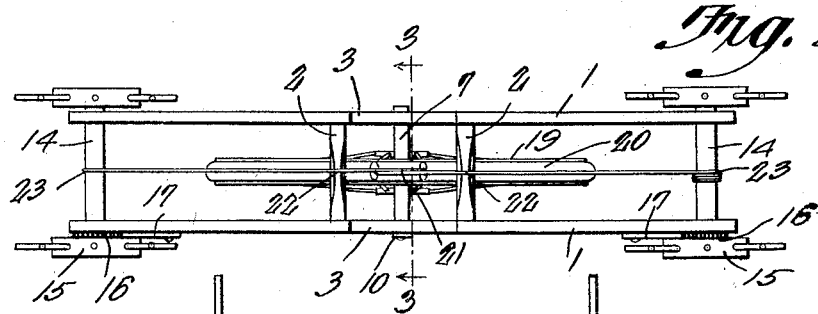

Figure 1 shows the invention in side elevation, applied to the wheel of a vehicle; Fig. 2 is a top plan; and Fig. 3 is a cross section on the line 3—3 of Fig. 2.

In carrying out the invention there is provided a frame comprising side bars 1, united intermediate their ends by members 2, constituting, at once, braces for the side bars and supports for the rim of the vehicle wheel. It is to be noted that the members 2 constitute the sole rigid and permanent connections between the side bars 1. The frame, therefore, in general outline is H-shaped. The side bars 1 are equipped in their upper edges with notches or openings 3, which as will be evident hereinafter, afford access to the ends of the tire wire, after the same has been tightened.

Figure 3:
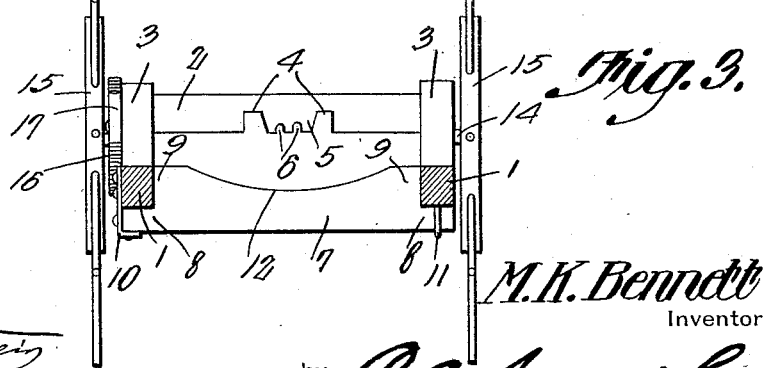

In Fig. 3 it will be seen that the lower edges of the rim supports 2 are provided with spaced notches 4, adapted to receive the edges of the rim of the vehicle wheel. Notches 4 define a depending boss 5, in the lower edge of which are fashioned one or more wire receiving notches 6. There may be any number of these notches 6, depending upon the number of wires which extend through the tire. Located below the lower faces of rim supports 2, and between the same, is a rim clamp 7, provided with reduced ends 8 defining shoulders 9 in the rim clamp. By means of a hinge 10 which may be a mere flexible strap, one of the reduced ends of the rim clamp 7 is connected with one of the side bars 1. The other reduced end 8 of the rim clamp 7 lies along the under face of the other side bar 1 and is received by an angular keeper 11 which depends from the side bar, the connection afforded by means of the hinge 10 being such that the rim clamp 7 may swing not only transversely of the side bars 1, but parallel thereto as well, to the end that one extremity of the rim clamp may be engaged with the keeper 11. The rim clamp 7 is provided in its upper edge with a concavity 12 which faces the notches 4 and 6 in the braces or supports 2.

Journaled for rotation in the side bars 1 adjacent the ends of the frame are winding shafts 14 each of which is provided at both ends with hand wheels 15. Each of the shafts 14 carries a ratchet wheel 16, the ratchet wheels 16 being adapted to be engaged by pawls 17 which are pivoted to the side bars 1.

The numeral 18 denotes a portion of a body of a vehicle, such as a baby carriage, the numeral 19 denoting one of the wheels thereof, and the numeral 20 denoting the tire.

Although the operation of setting the tire may be varied, depending upon the structure of the vehicle, the vehicle as shown in Fig. 1, may be inverted, the frame being superposed upon the vehicle wheel 19, the edges of the rim of the wheel 19 being received in the notches 4 in the rim supports 2. The rim clamp 7 is then swung between the spokes of the wheel and is engaged at one end with the keeper 11, the rim of the wheel being bound between the rim clamp 7 and the rim supports 2. The tire is placed around the wheel 19, and the wire which is located within the tire is crossed upon itself as indicated at 21, the ends of the wire passing, as indicated at 22, across the upper edges of the supports 2, the extremities of the wire being connected as indicated at 23 with the winding shafts 14. When rotatory movement is imparted to the shafts 14 by the medium of the hand wheels 15, the wire will be tightened, therefore binding the tire 20 upon the periphery of the wheel 19, the wire being held taut by the engagement between the pawls 17 and the ratchet wheels 16. The ends of the wire may be twisted together at the point 21, or they may be brazed or they may be connected in any other desired manner, whereupon the ends of the wire are clipped off adjacent the point 21, the ends being clenched down so as not to interfere with the tire. By means of a tool, well known in the art, the ends of the tire 20 are brought together adjacent the point 21.

Noting Fig. 1 it will be seen that the notches or openings 3 in the upper edges of the side bars 1 serve to give access to the wire, during the uniting of the same. It is obvious, however, that these notches 3 serve to weaken the side bars 1 to some extent. However, this weakening of the side bars 1 is offset by reason of the fact that the rim clamp 7 is equipped with the shoulders 9 which engage the side bars 1 adjacent the notches 3. The rigidity of the structure, therefore, is not impaired by the formation of the notches 3. It is to be observed, further, that the shoulders 9 serve to prevent the rim clamp 7 from moving longitudinally, and consequently, the rim clamp will not saw upon the rim and mar the same.

It is to be noted that the structure hereinbefore described is so constituted that it may be applied to the wheel of a vehicle, without removing the wheel. The operation of setting the tire may be carried out at any place where the vehicle happens to be located, it being unnecessary to remove the wheel and to carry on the operation at a work bench.

Having thus described the invention what is claimed is:—

A tire setting device comprising a pair of parallel side bars; braces connecting the side bars; a rim clamp located between the braces, one end of the rim clamp being pivoted to one bar; means on the other bar for receiving the other end of the clamp detachably; and tightening devices carried by the ends of the bars; the braces being provided with wire receiving notches, the notches of the respective braces being spaced at equal distances from the respective side bars and both bars extending across the space between the braces thereby to avoid a lateral flexure of the frame and a displacement of the wire from the notches when the tightening devices are operated, both bars being provided with notches in their upper edges and between the braces to give access to the tire, and the braces serving to reinforce the side bars adjacent the notches, the clamp having shoulders which engage the inner faces of the side bars at the bases of the notches to prevent the bars from springing toward each other when the tightening devices are operated.

In testimony that I claim the foregoing as my own, I have hereto affixed my signature in the presence of two witnesses.

MADISON K. BENNETT.

Witnesses:
L. H. MOORE,
JAS. MORIN.